US012566749B1

(12) United States Patent　　　(10) Patent No.:　US 12,566,749 B1
Wang et al.　　　　　　　　　　　　(45) Date of Patent:　　Mar. 3, 2026

(54) METHOD TO INTELLIGENTLY COMPARE DATABASE IN RESUMABLE BATCH MODE

(71) Applicant: International Business Machines Corporation, Armonk, NY (US)

(72) Inventors: Hui Wang, Beijing (CN); Yu Mei Dai, Beijing (CN); Xiang Yu Xue, Rizhao (CN); Mai Zeng, Beijing (CN); Xiao Chen Huang, Beijing (CN); Peng Hui Jiang, Beijing (CN); Wei Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/013,140

(22) Filed: Jan. 8, 2025

(51) Int. Cl.
　　*G06F 17/30*　　　(2006.01)
　　*G06F 16/22*　　　(2019.01)
　　*G06F 16/23*　　　(2019.01)
(52) U.S. Cl.
　　CPC ...... *G06F 16/2365* (2019.01); *G06F 16/2282* (2019.01)
(58) Field of Classification Search
　　CPC ........ G06F 16/13; G06F 16/24; G06F 16/156; G06F 3/1297; G06N 3/00; G06N 5/00; G05B 13/00; H03M 7/30; H04N 9/8042; G06T 9/00
　　See application file for complete search history.

(56) References Cited

U.S. PATENT DOCUMENTS

| | | | | |
|---|---|---|---|---|
| 8,930,306 B1 * | 1/2015 | Ngo | ...................... | G06F 16/178 |
| | | | | 707/625 |
| 9,904,601 B2 * | 2/2018 | Patterson | .............. | G06F 16/128 |
| 2004/0210904 A1 * | 10/2004 | Jones | ................... | G06F 9/4887 |
| | | | | 718/107 |
| 2005/0038852 A1 * | 2/2005 | Howard | ............... | G06F 9/5044 |
| | | | | 709/205 |
| 2005/0240943 A1 * | 10/2005 | Smith | ....................... | G06F 3/00 |
| | | | | 719/328 |
| 2006/0178776 A1 * | 8/2006 | Feingold | ........... | G01N 35/0092 |
| | | | | 700/245 |
| 2021/0255903 A1 * | 8/2021 | Wang | ...................... | G06F 9/546 |
| 2023/0305853 A1 * | 9/2023 | Ciolkosz | ................ | G06F 9/522 |
| 2024/0248913 A1 * | 7/2024 | Shankar | ............. | G06F 16/2343 |
| 2025/0123881 A1 * | 4/2025 | Sankaran | ........... | G06F 9/30036 |
| 2025/0291502 A1 * | 9/2025 | Choquette | ............. | G06F 3/0631 |

FOREIGN PATENT DOCUMENTS

| | | |
|---|---|---|
| CN | 105989194 B | 12/2019 |
| CN | 113495890 B | 5/2024 |
| CN | 118535552 A | 8/2024 |
| CN | 118689872 A | 9/2024 |
| TW | 202127273 A | 7/2021 |

* cited by examiner

*Primary Examiner* — Hung D Le

(74) *Attorney, Agent, or Firm* — Yee & Associates, P.C.

(57)　　　　　　　ABSTRACT

A computer-implemented method to intelligently compare a database in resumable batch mode is provided. A number of processor units reallocate a plurality of available threads among at least one of the tPartitioner, the plurality of tCombiners, and the diffReporter using an ArrayList of a threadManager of a TablePair Container. According to other illustrative embodiments, a computer system and computer program product for intelligently comparing a database in resumable batch mode are provided.

20 Claims, 6 Drawing Sheets

500

510 — LOADING, BY A NUMBER PROCESSOR UNITS, A PLURALITY OF LocalQueueTabPairs INTO A TablePair INFO OF A TablePair CONTAINER 520 — ALLOCATING, BY THE NUMBER OF PROCESSOR UNITS, A PLURALITY OF AVAILABLE THREADS AMONG A tPartitioner, A PLURALITY OF tCombiners OF A COMBINER POOL, AND A diffReporter USING AN ArrayList OF A threadManager OF THE TablePair CONTAINER 530 — DELEGATING, BY THE NUMBER OF PROCESSOR UNITS, A PLURALITY OF QUEUE TASKS FROM THE TablePair INFO AMONG THE PLURALITY OF tCombiners OF THE COMBINER POOL USING THE tPartitioner AND THE TablePair CONTAINER 540 — IDENTIFYING, BY THE NUMBER OF PROCESSOR UNITS, DIFFERENCES FROM THE PLURALITY OF QUEUE TASKS USING THE PLURALITY OF tCombiners OF THE COMBINER POOL 550 — RESPONSIVE TO THE DIFFERENCES, REPORTING, BY THE NUMBER OF PROCESSOR UNITS, THE DIFFERENCES TO A TABLE PAIR RESULT MAP OF THE TablePair CONTAINER USING THE diffReporter AND THE TablePair CONTAINER 560 — REALLOCATING, BY THE NUMBER OF PROCESSOR UNITS, THE PLURALITY OF AVAILABLE THREADS AMONG AT LEAST ONE OF THE tPartitioner, THE PLURALITY OF tCombiners, AND THE diffReporter USING THE ArrayList OF THE threadManager OF THE TablePair CONTAINER

COMPUTING ENVIRONMENT
100

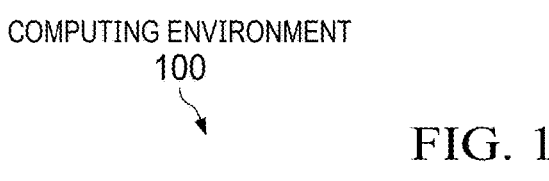

FIG. 1

COMPUTER          101

PROCESSOR SET          110

120 — PROCESSING CIRCUITRY          CACHE — 121

111 — COMMUNICATION FABRIC

112 — VOLATILE MEMORY

PERSISTENT STORAGE          113

122 — OPERATING SYSTEM          COMPUTER PROGRAM PRODUCT — 190

PERIPHERAL DEVICE SET          114

123 — UI DEVICE SET          124 — STORAGE          IoT SENSOR SET — 125

NETWORK MODULE          115

103

END USER DEVICE

PRIVATE CLOUD

106

WAN          102

REMOTE SERVER

REMOTE DATABASE

130

104

GATEWAY          140

PUBLIC CLOUD          105

141 — CLOUD ORCHESTRATION MODULE          HOST PHYSICAL MACHINE SET — 142

143 — VIRTUAL MACHINE SET          CONTAINER SET — 144

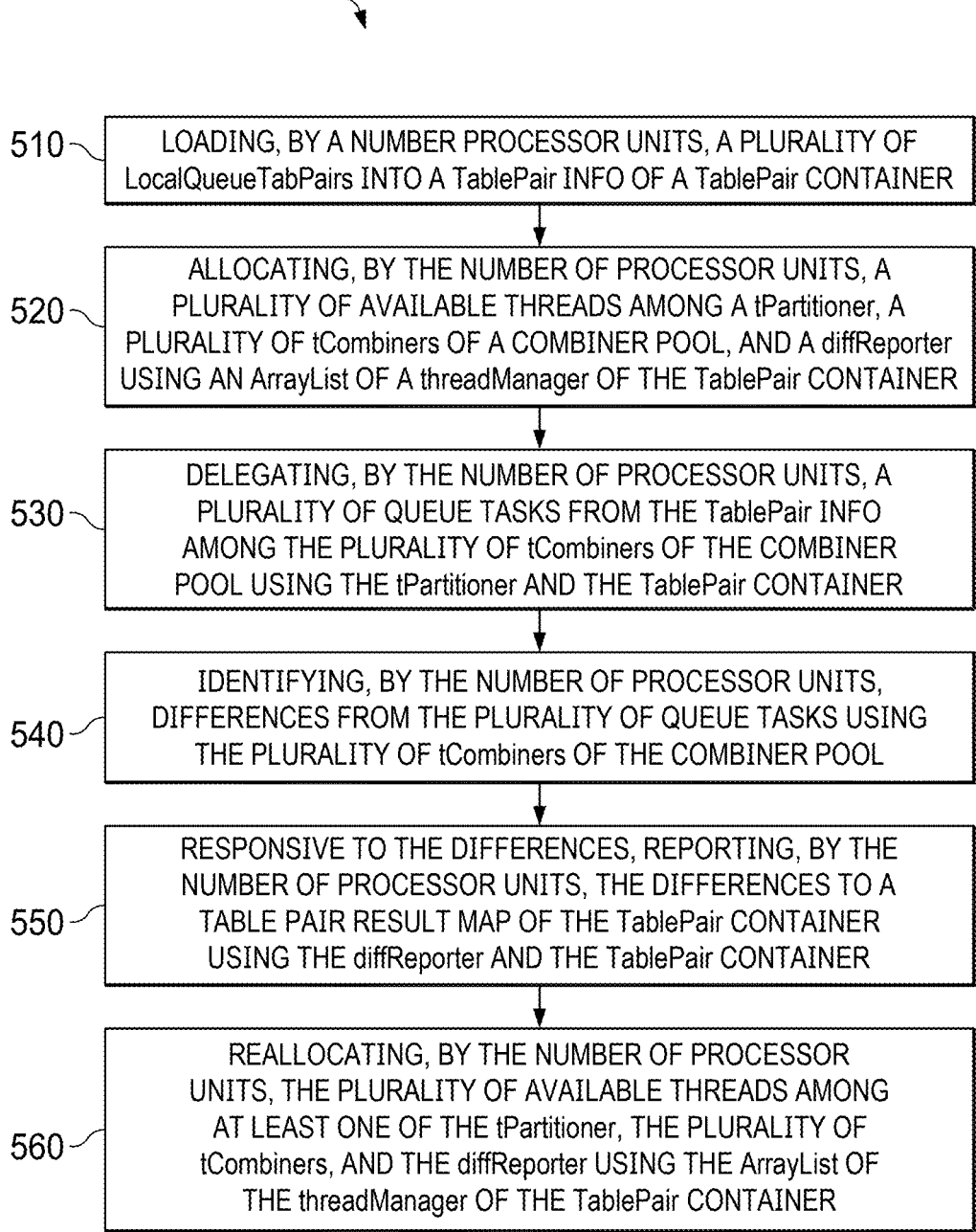

500

510 — LOADING, BY A NUMBER PROCESSOR UNITS, A PLURALITY OF LocalQueueTabPairs INTO A TablePair INFO OF A TablePair CONTAINER 520 — ALLOCATING, BY THE NUMBER OF PROCESSOR UNITS, A PLURALITY OF AVAILABLE THREADS AMONG A tPartitioner, A PLURALITY OF tCombiners OF A COMBINER POOL, AND A diffReporter USING AN ArrayList OF A threadManager OF THE TablePair CONTAINER 530 — DELEGATING, BY THE NUMBER OF PROCESSOR UNITS, A PLURALITY OF QUEUE TASKS FROM THE TablePair INFO AMONG THE PLURALITY OF tCombiners OF THE COMBINER POOL USING THE tPartitioner AND THE TablePair CONTAINER 540 — IDENTIFYING, BY THE NUMBER OF PROCESSOR UNITS, DIFFERENCES FROM THE PLURALITY OF QUEUE TASKS USING THE PLURALITY OF tCombiners OF THE COMBINER POOL 550 — RESPONSIVE TO THE DIFFERENCES, REPORTING, BY THE NUMBER OF PROCESSOR UNITS, THE DIFFERENCES TO A TABLE PAIR RESULT MAP OF THE TablePair CONTAINER USING THE diffReporter AND THE TablePair CONTAINER 560 — REALLOCATING, BY THE NUMBER OF PROCESSOR UNITS, THE PLURALITY OF AVAILABLE THREADS AMONG AT LEAST ONE OF THE tPartitioner, THE PLURALITY OF tCombiners, AND THE diffReporter USING THE ArrayList OF THE threadManager OF THE TablePair CONTAINER

METHOD TO INTELLIGENTLY COMPARE DATABASE IN RESUMABLE BATCH MODE

BACKGROUND

The disclosure relates generally to methods, systems and computer program products to intelligently compare a database, and more specifically to an adaptive method to intelligently compare a database in resumable batch mode.

Current database compare processes consist of three stages that are executed sequentially. The three stages are preprocessing, differencing, and cleanup.

Preprocessing verifies if all the required conditions are met and then computes the optimal number of parallel threads to use for comparison and the optimal number of partitions to divide the source and target tables. The non-logged Global Temporary Tables (GTT) are created at both source and target side to temporary records the row-based key values and checksums.

Differencing relies on a pool of cooperative threads. A tPartitioner thread splits the whole table compare into smaller but similar-sized tasks (each of which corresponds to a subset/partition of the source and target tables). tCombiner threads are responsible for identifying the differences from all the assigned partition compares. A diffReporter thread reports the differences that are identified by Merger threads.

Cleanup drops the definition of the GTT from the database catalogs and outputs the difference summary and the completion statistics of each thread.

SUMMARY

According to an illustrative embodiment, a computer-implemented method for intelligently comparing a database in resumable batch mode is provided. A number of processor units load a plurality of LocalQueueTabPairs into a Table-Pair Info of a TablePair Container. The number of processor units allocate a plurality of available threads among a tPartitioner, a plurality of tCombiners of a Combiner Pool, and a diffReporter using an ArrayList of a threadManager of the TablePair Container. The processor units delegate a plurality of Queue Tasks from the TablePair Info among the plurality of tCombiners of the Combiner Pool using the tPartitioner and the TablePair Container. The processor units identify differences from the plurality of Queue Tasks using the plurality of tCombiners of the Combiner Pool. The processor units, responsive to the differences, report the differences to a Table Pair Result Map of the TablePair container using the diffReporter and the TablePair Container. The processor units reallocate the plurality of available threads among at least one of the tPartitioner, the plurality of tCombiners, and the diffReporter using the ArrayList of the threadManager of the TablePair Container. According to other illustrative embodiments, a computer system and computer program product for intelligently comparing a database in resumable batch mode are provided.

Embodiments of this disclosure include methods, systems, and computer program products to intelligently compare database tables. These embodiments can include the following features. Embodiments can include a multi-layer module to decouple different components for achieving high parallelism and flexibility. The multi-layer module can include partitioning, comparing, and reporting. Each component can be extended to a group of cooperative threads having the same functions. The number of threads can be automatically adjusted to better fit the workload. Embodiments can include a resumable compare for a batch mode. Embodiments can include an adaptive compare. To get the better performance, this disclosure proposes an adaptive compare solution that is capable of automatically and intelligently adjusting the parameters and number of threads based on identification of runtime bottlenecks.

BRIEF DESCRIPTION OF THE DRAWINGS

FIG. 1 is a block diagram of a computing environment in accordance with an illustrative embodiment;

FIG. 5 is a flow chart of a process in accordance with an illustrative embodiment.

DETAILED DESCRIPTION

Figure 2:
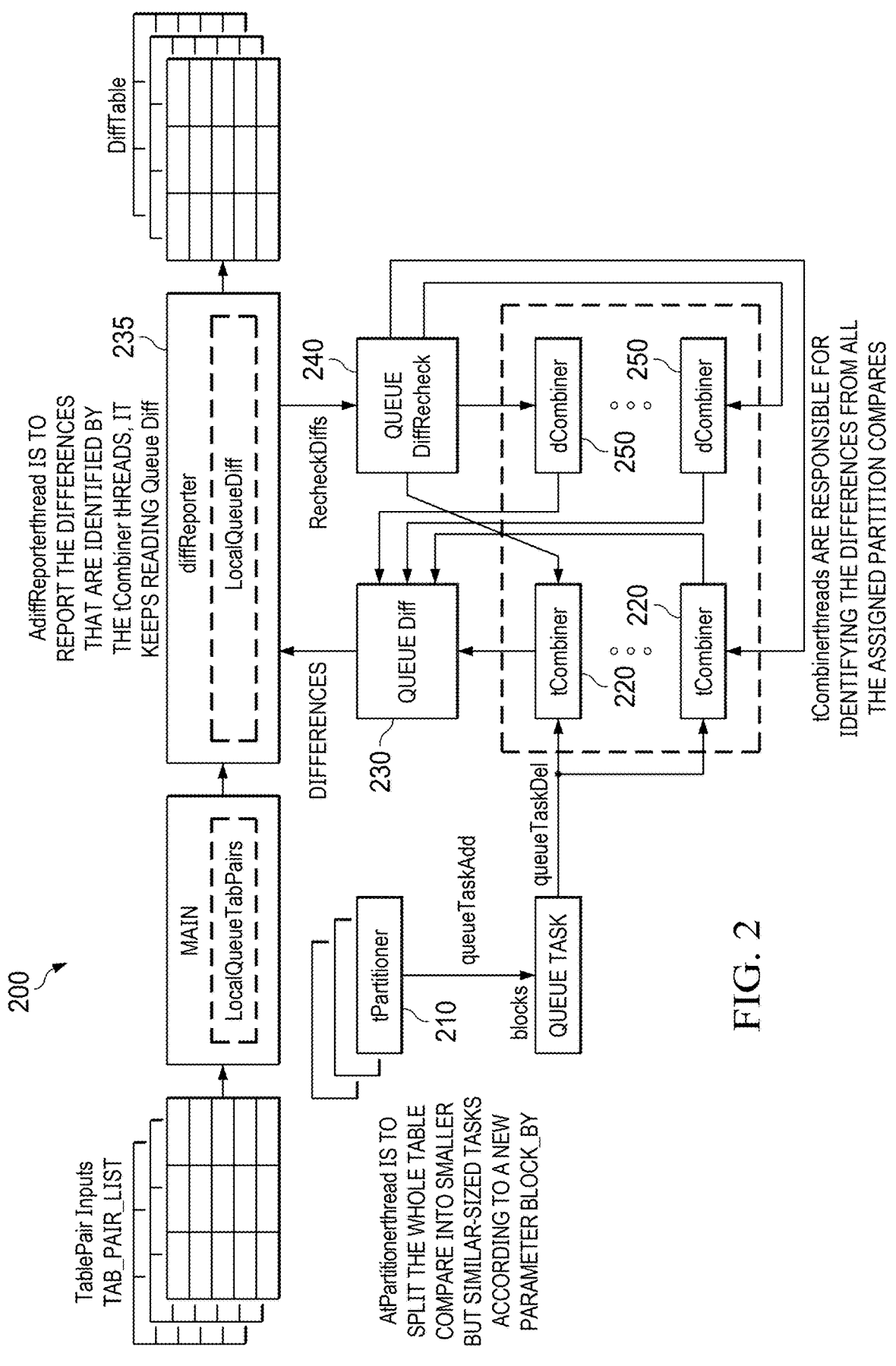
FIG. 2 is a block diagram of an architecture to intelligently compare a database in a resumable batch mode in accordance with an illustrative embodiment.

Embodiments include a computer implemented method including: loading, by a number of processor units, a plurality of LocalQueueTabPairs into a TablePair Info of a TablePair Container; allocating, by the number of processor units, a plurality of available threads among a tPartitioner, a plurality of tCombiners of a Combiner Pool, and a diffReporter using an ArrayList of a threadManager of the TablePair Container; delegating, by the number of processor units, a plurality of Queue Tasks from the TablePair Info among the plurality of tCombiners of the Combiner Pool using the tPartitioner and the TablePair Container; identifying, by the number of processor units, differences from the plurality of Queue Tasks using the plurality of tCombiners of the Combiner Pool; responsive to the differences, reporting, by the number of processor units, the differences to a Table Pair Result Map of the TablePair container using the diffReporter and the TablePair Container; and reallocating, by the number of processor units, the plurality of available threads among at least one of the tPartitioner, the plurality of tCombiners, and the diffReporter using the ArrayList of the threadManager of the TablePair Container. As a result, these illustrative embodiments provide a technical effect of adaptively comparing a database.

Some embodiments further include monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads among at least one of the tPartitioner, the plurality of tCombiners, and the diffReporter using the ArrayList of the threadManager of the TablePair Container. As a result, these illustrative embodiments provide a technical effect of equalizing and/or increasing the plurality of busy rates by further reallocating the plurality of available threads among at least one of the tPartitioner, the plurality of tCombiners, and the diffReporter.

In some embodiments, reallocating comprises reallocating, by the number of processor units, the plurality of available threads within the plurality of tCombiners using the ArrayList of the threadManager of the TablePair Container. As a result, these illustrative embodiments provide a technical effect of reallocating the plurality of available threads within the plurality of tCombiners.

Some embodiments further include monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads within the plurality of tCombiners using the ArrayList of the threadManager of the TablePair Container. As a result, these illustrative embodiments provide a technical effect of equalizing and/or increasing the plurality of busy rates by further reallocating the plurality of available threads within the plurality of tCombiners.

In some embodiments, reallocating comprises reallocating, by the number of processor units, the plurality of available threads between at least two of the tPartitioner, the plurality of tCombiners, and the diffReporter using the ArrayList of the threadManager of the TablePair Container. As a result, these illustrative embodiments provide a technical effect of reallocating the plurality of available threads between at least two of the tPartitioner, the plurality of tCombiners, and the diffReporter.

Some embodiments further include monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads between at least two of the tPartitioner, the plurality of tCombiners, and the diffReporter using the ArrayList of the threadManager of the TablePair Container. As a result, these illustrative embodiments provide a technical effect of at least one of equalizing and/or increasing the plurality of busy rates by further reallocating the plurality of available threads between at least two of the tPartitioner, the plurality of tCombiners, and the diffReporter.

Some embodiments further include pausing and resuming while in a batch mode the step of identifying, by the number of processor units, differences from the plurality of Queue Tasks using the plurality of tCombiners of the Combiner Pool. As a result, these illustrative embodiments provide a technical effect of pausing and resuming while in a batch mode the step of identifying differences from the plurality of Queue Tasks.

Some embodiments further include rechecking the differences, by the number of processor units, using a DiffRecheck. As a result, these illustrative embodiments provide a technical effect of rechecking the differences using a DiffRecheck.

Embodiments include a computer system including: a processor set; a set of one or more computer readable storage media; program instructions, collectively stored in the set of one or more storage media, for causing the processor set to perform the following computer operations: load, by a number of processor units, a plurality of Local-QueueTabPairs into a TablePair Info of a TablePair Container; allocate, by the number of processor units, a plurality of available threads among a tPartitioner, a plurality of tCombiners of a Combiner Pool, and a diffReporter using an ArrayList of a threadManager of the TablePair Container; delegate, by the number of processor units, a plurality of Queue Tasks from the TablePair Info among the plurality of tCombiners of the Combiner Pool using the tPartitioner and the TablePair Container; identify, by the number of processor units, differences from the plurality of Queue Tasks using the plurality of tCombiners of the Combiner Pool; responsive to the differences, report, by the number of processor units, the differences to a Table Pair Result Map of the TablePair container using the diffReporter and the TablePair Container; and reallocate, by the number of processor units, the plurality of available threads among at least one of the tPartitioner, the plurality of tCombiners, and the diffReporter using the ArrayList of the threadManager of the TablePair Container. As a result, these illustrative embodiments provide a technical effect of adaptively comparing a database.

In some embodiments, the program instructions cause the processor set to perform the following computer operations: monitor, using the number of processor units, a plurality of busy rates for at least two subsets of the plurality of available threads; and responsive to the plurality of busy rates, at least one of equalize and increase the plurality of busy rates by further reallocate by the number of processors, the plurality of available threads among at least one of the tPartitioner, the plurality of tCombiners, and the diffReporter using the ArrayList of the threadManager of the TablePair Container. As a result, these illustrative embodiments provide a technical effect of equalizing and/or increasing the plurality of busy rates by further reallocating the plurality of available threads among at least one of the tPartitioner, the plurality of tCombiners, and the diffReporter.

In some embodiments, reallocating comprises reallocating, by the number of processor units, the plurality of available threads within the plurality of tCombiners using the ArrayList of the threadManager of the TablePair Container. As a result, these illustrative embodiments provide a technical effect of equalizing and/or increasing the plurality of busy rates by further reallocating the plurality of available threads within the plurality of tCombiners.

In some embodiments, the program instructions cause the processor set to perform the following computer operations: monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads within the plurality of tCombiners using the ArrayList of the thread-Manager of the TablePair Container. As a result, these illustrative embodiments provide a technical effect of equalizing and/or increasing the plurality of busy rates by further reallocating the plurality of available threads within the plurality of tCombiners.

In some embodiments, reallocating comprises reallocating, by the number of processor units, the plurality of available threads between at least two of the tPartitioner, the plurality of tCombiners, and the diffReporter using the ArrayList of the threadManager of the TablePair Container. As a result, these illustrative embodiments provide a technical effect of reallocating the plurality of available threads between at least two of the tPartitioner, the plurality of tCombiners, and the diffReporter.

In some embodiments, the program instructions cause the processor set to perform the following computer operations: monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads between at least two of the tPartitioner, the plurality of tCombiners, and the diffReporter using the ArrayList of the threadManager of the TablePair Container. As a result, these illustrative embodiments provide a technical effect of at least one of equalizing and/or increasing the plurality of busy rates by further reallocating the plurality of available threads between at least two of the tPartitioner, the plurality of tCombiners, and the diffReporter.

In some embodiments, the program instructions cause the processor set to perform the following computer operations: pausing and resuming while in a batch mode the step of identifying, by the number of processor units, differences from the plurality of Queue Tasks using the plurality of tCombiners of the Combiner Pool. As a result, these illustrative embodiments provide a technical effect of pausing and resuming while in a batch mode the step of identifying differences from the plurality of Queue Tasks.

In some embodiments, the program instructions cause the processor set to perform the following computer operations: rechecking the differences, by the number of processor units, using a DiffRecheck. As a result, these illustrative embodiments provide a technical effect of rechecking the differences using a DiffRecheck.

Embodiments include a computer program product including: a set of one or more computer-readable storage media; and program instructions, collectively stored in the set of one or more storage media, for causing a processor set to perform the following computer operations: loading, by a number of processor units, a plurality of Local-QueueTabPairs into a TablePair Info of a TablePair Container; allocating, by the number of processor units, a plurality of available threads among a tPartitioner, a plurality of tCombiners of a Combiner Pool, and a diffReporter using an ArrayList of a threadManager of the TablePair Container; delegating, by the number of processor units, a plurality of Queue Tasks from the TablePair Info among the plurality of tCombiners of the Combiner Pool using the tPartitioner and the TablePair Container; identifying, by the number of processor units, differences from the plurality of Queue Tasks using the plurality of tCombiners of the Combiner Pool; responsive to the differences, reporting, by the number of processor units, the differences to a Table Pair Result Map of the TablePair container using the diffReporter and the TablePair Container; and reallocating, by the number of processor units, the plurality of available threads among at least one of the tPartitioner, the plurality of tCombiners, and the diffReporter using the ArrayList of the threadManager of the TablePair Container. As a result, these illustrative embodiments provide a technical effect of adaptively comparing a database.

In some embodiments, the program instructions cause the processor set to perform the following computer operations: monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads among at least one of the tPartitioner, the plurality of tCombiners, and the diffReporter using the ArrayList of the threadManager of the TablePair Container. As a result, these illustrative embodiments provide a technical effect of equalizing and/or increasing the plurality of busy rates by further reallocating the plurality of available threads among at least one of the tPartitioner, the plurality of tCombiners, and the diffReporter.

In some embodiments, reallocating comprises reallocating, by the number of processor units, the plurality of available threads within the plurality of tCombiners using the ArrayList of the threadManager of the TablePair Container. As a result, these illustrative embodiments provide a technical effect of equalizing and/or increasing the plurality of busy rates by further reallocating the plurality of available threads within the plurality of tCombiners.

In some embodiments, the program instructions cause the processor set to perform the following computer operations: monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads within the plurality of tCombiners using the ArrayList of the threadManager of the TablePair Container. As a result, these illustrative embodiments provide a technical effect of equalizing and/or increasing the plurality of busy rates by further reallocating the plurality of available threads within the plurality of tCombiners.

In some embodiments, reallocating comprises reallocating, by the number of processor units, the plurality of available threads between at least two of the tPartitioner, the plurality of tCombiners, and the diffReporter using the ArrayList of the threadManager of the TablePair Container. As a result, these illustrative embodiments provide a technical effect of reallocating the plurality of available threads between at least two of the tPartitioner, the plurality of tCombiners, and the diffReporter.

In some embodiments, the program instructions cause the processor set to perform the following computer operations: monitoring, using the number of processor units, a plurality of busy rates for at least two subsets of the plurality of available threads; and responsive to the plurality of busy rates, at least one of equalizing and increasing the plurality of busy rates by further reallocating, by the number of processors, the plurality of available threads between at least two of the tPartitioner, the plurality of tCombiners, and the diffReporter using the ArrayList of the threadManager of the TablePair Container. As a result, these illustrative embodiments provide a technical effect of at least one of equalizing and/or increasing the plurality of busy rates by further reallocating the plurality of available threads between at least two of the tPartitioner, the plurality of tCombiners, and the diffReporter.

In some embodiments, the program instructions cause the processor set to perform the following computer operations: pausing and resuming while in a batch mode the step of identifying, by the number of processor units, differences from the plurality of Queue Tasks using the plurality of tCombiners of the Combiner Pool. As a result, these illustrative embodiments provide a technical effect of pausing and resuming while in a batch mode the step of identifying differences from the plurality of Queue Tasks.

In some embodiments, the program instructions cause the processor set to perform the following computer operations: rechecking the differences, by the number of processor units, using a DiffRecheck. As a result, these illustrative embodiments provide a technical effect of rechecking the differences using a DiffRecheck.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as predicting, using an artificial intelligence enabled system, an incremental degradation of a battery of a transportation vehicle, calculating an equivalent carbon footprint, calculating an equivalent carbon footprint tax, and assessing the tax against the vehicle. Embodiments of this disclosure can be embodied in computer program product 190. In addition to computer program product 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and computer program product 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile sequestering device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in computer program product 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in computer program product 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

With reference now to FIG. 2, an exemplary computer system 200 architecture is shown for an adaptive method to intelligently compare a database. A tPartitionerthread 210 splits the whole table compare into smaller but similar-sized tasks according to a new parameter BLOCK_BY. A plurality of tCombinerthreads 220 identifies the differences from all the assigned partition compares via Queue Diff 230. A diffReporterthread 235 reports the differences that are identified by the tCombiner threads 220. Optionally, a plurality of dCombinerthreads 250 recheck via Queue DiffRecheck 240.

Figure 3:
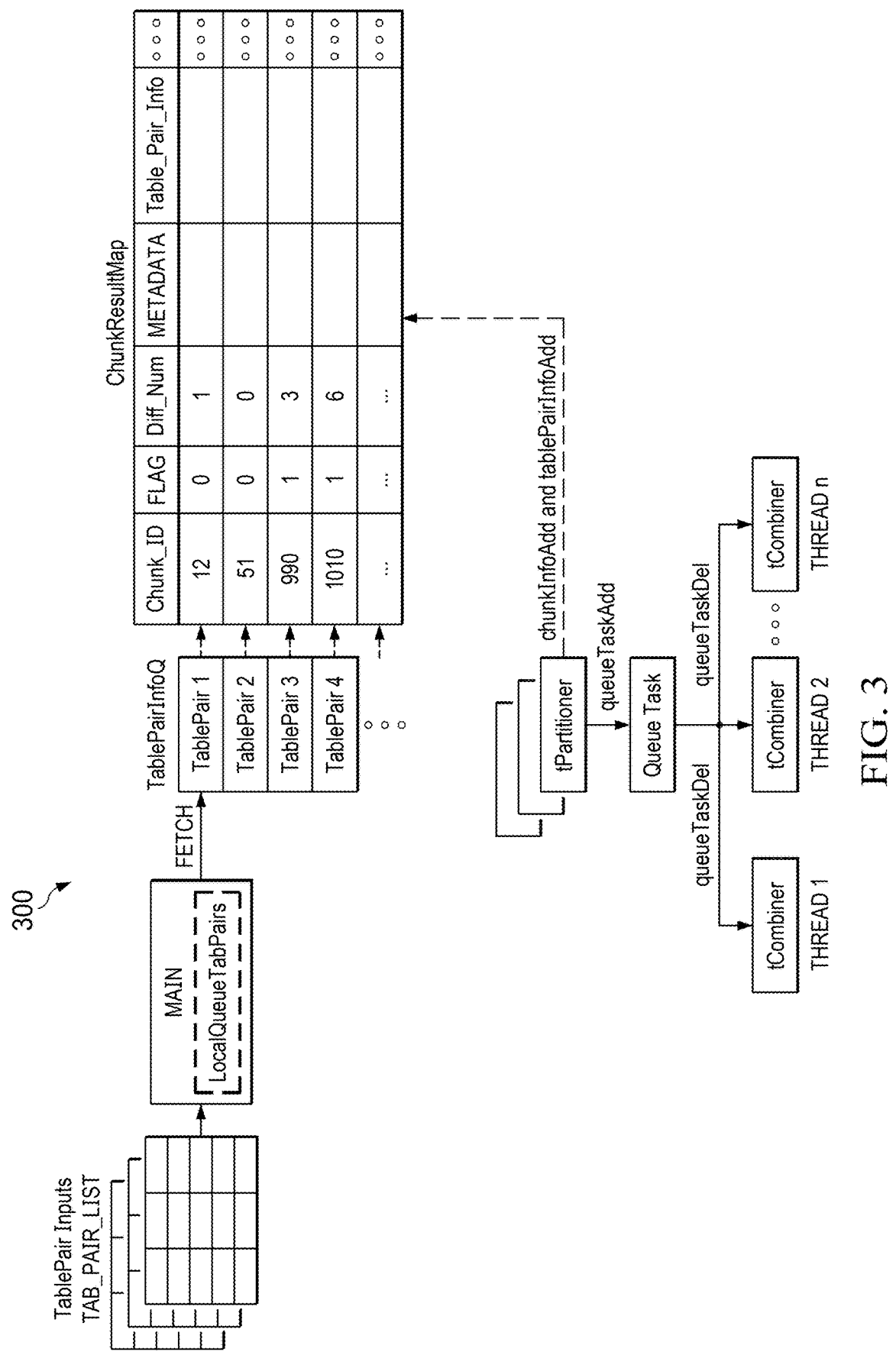
FIG. 3 is a block diagram of dataflow for comparing progress reporting in accordance with an illustrative embodiment.

Turning next to FIG. 3, a data flow 300 for an example of compare progress reporting is shown for an adaptive method to intelligently compare a database. Compare progress reporting for supporting batch compare and reporting can include TablePairInfoQ and ChunkResultMap where TablePairInfoQ stores the table pair information. For each chunk of a specific table pair in the queue, a ChunkResultMap is created to record the corresponding compare results. The initial TablePairInfoQ is empty. ChunkResultMap is the in-memory data structure of the table DIFFCHUNKS for a specific table.

Embodiments of this disclosure can include the following compare progress reporting elements:

1. When the batch compare starts, the main thread read the input table TAB_PAIR_LIST
2. Put table pair input into a data structure LocalQueueTabPairs. LocalQueueTabPairs contains the cleaned and preprocessed contents that are fetched from table TAB_PAIR_LIST.
3. In one embodiment, the sequence in LocalQueueTabPairs is sorted based on the user-specified priority order.
4. These compare tasks are sent to tPartitioner via an internal in-memory cross-thread queue. These compare tasks will be cut to smaller chunks by tPartitioner if necessary.
5. The tPartitioner will also record the chunk-related metadata and table pair information in the corresponding chunk result. The chunks are independent to each other. They can be compared in a mixed order and in a concurrent method.
6. Each item in the ChunkResult map will have a chunk identifier, a flag to mark the chunk comparison status, and a number to show how many differences are found by tCombiner.

To monitor compare status and support the restart-able Compare, our solution stores the compare status for each chunk and each table in an external media, including database tables or files. A table CHUNK stores the corresponding status of chunks, a table DIFF stores differences, and the table TAB_PAIR_LIST table records the comparison status of each table pair.

tPartitioner/tCombiner/diffReporter modify these tables when table/chunk/diff status changes.

tPartitioner: This thread inserts new chunks into CHUNK and the initial status is set to R. Before inserting the first chunk of a specific table into CHUNK, it updates the status of comparison status for this table from R to C.

tCombiner: This thread updates the comparison status of a chunk from R to C when it starts comparing of this chunk, generated by tPartitioner thread.

diffReporter: This thread inserts newly identified differences into DIFF. When a compare of a specific chunk is completed (including the rechecking of all the associated differences), it will update the comparison status of this chunk from C to F. When compare of all the chunks of a specific table is completed, it will update the comparison status for this table from C to F.

Embodiments of this disclosure can include resumable compare for the batch mode. The comparison can be restarted from the point it was last stopped with a new parameter RESUME_DIFF=Y|N.

TAB_PAIR_LIST stores all table pairs that need a compare.

DIFFCHUNKS contains one row for each pair of chunks to compare, and a status column that keeps track of the compare progress for each pair.

When RESUME_DIFF=N, on startup, all the values of column COMPARE_STATE in the input table TAB_PAIR_LIST will be set to R (Ready). The ongoing batch compare will start the compare from high to low according to their priority values.

When RESUME_DIFF=Y, on startup, all the rows in the table DIFFCHUNKS whose associated tables' COMPARE_STATE is marked as F (Finished) in the input table TAB_PAIR_LIST will be deleted. Then set all the remaining states from C (Comparing) to R (Ready). The batch compare will resume the compare with the COMPARE_STATE R from high to low according to their priority values.

| RESUME_DIFF = N Table | | |
|---|---|---|
| COMPARE_STATE | | . . . |
| Pair01 | F -> R | . . . |
| Pair02 | C -> R | . . . |
| Pair03 | . . . | . . . |

| RESUME_DIFF = Y Table | | |
|---|---|---|
| COMPARE_STATE | | . . . |
| Pair01 | F -> delete | . . . |
| Pair02 | C -> R | . . . |
| Pair03 | . . . | . . . |

In the batch compare process, multiple types of threads are created. Generally, compare performance can be controlled by the number of comparison threads. To get the best performance, this disclosure proposes an adaptive compare solution that is capable of automatically adjusting the parameters and threads based on identification of runtime bottlenecks.

In one embodiment, compare tools runs with limited resource or other restrictions. User can specify the total upper limit of number of threads. The objective of our adaptive compare is to provide the best performance number with the given resource limits. tPartitioner/tCombiner/diffReporter are multithreaded. The number of threads for each thread type can be automatically adjusted.

In one embodiment, a new thread threadManager is introduced to monitor busy rate for each thread and adjust the number of threads for each thread type based on the busy rates. In one embodiment, the busy rate can be output to a thread monitor table or file for further performance analysis.

Based on the catalog/statistics table, threadManager can adjust the initial number. In one embodiment, threadManager determines how many threads are adjusted for tPartitioner based on the number of table pairs, the total number of rows, and the average row size.

Figure 4:
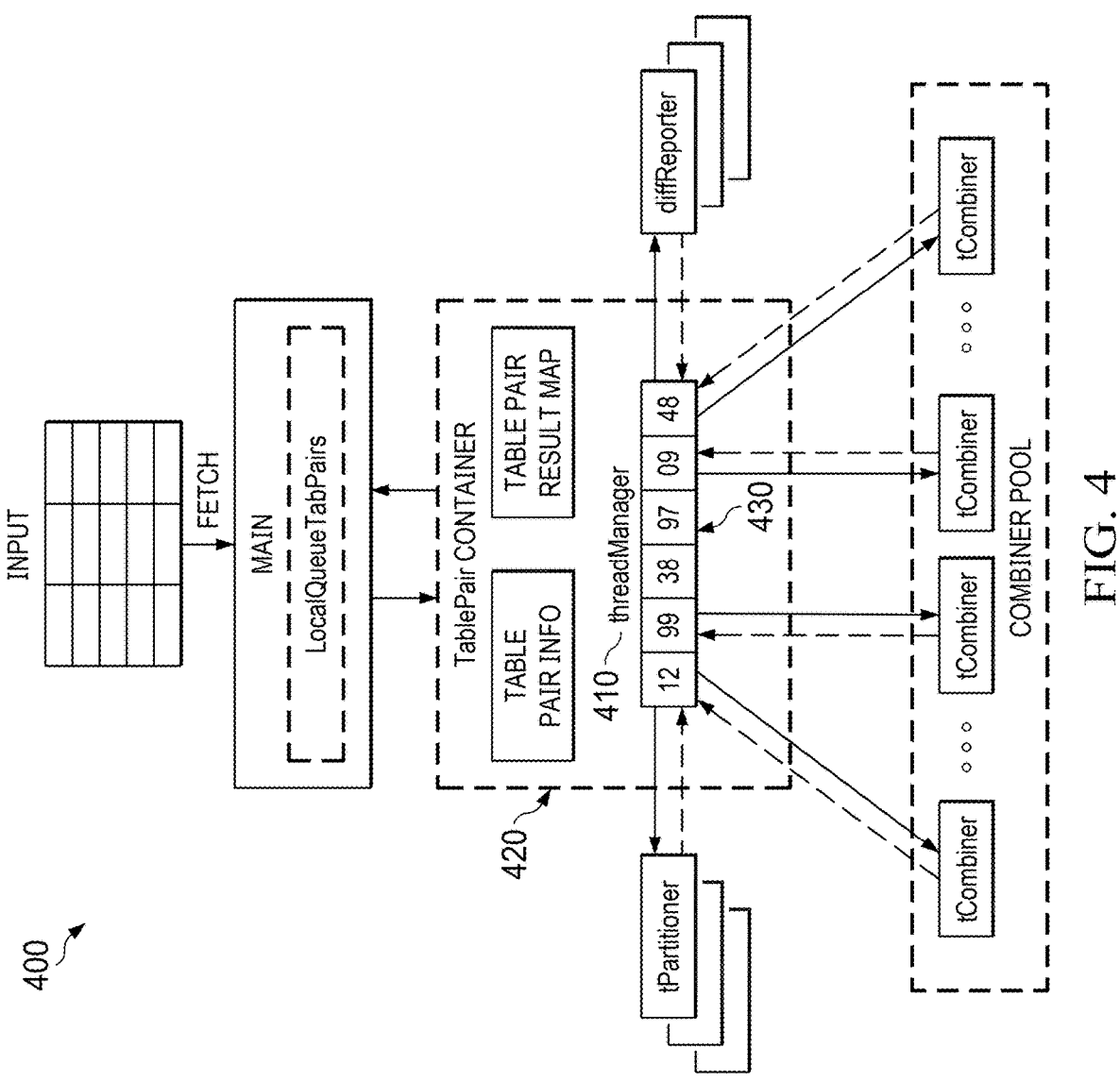
FIG. 4 is a block diagram of dataflow for monitoring and self-adapting in accordance with an illustrative embodiment.

Turning next to FIG. 4, a data flow 400 for an example of an adaptive method to intelligently compare a database is shown. threadManager 410 of TablePairContainer 420 will maintain busy rates for each active thread. The threadManager 410 uses ArrayList 430 as the internal data structure. Each item corresponds to a specific thread. The rate is the working time of the last monitor interval.

The adaptive method can include monitoring a plurality of busy rates for at least two subsets of the plurality of available threads; and responsive to the plurality of busy rates, at least one of equalizing and increasing the plurality of busy rates by further reallocating the plurality of available threads among at least one of the tPartitioner, the plurality of tCombiners, and the diffReporter using the ArrayList 430 of the threadManager 410 of the TablePair Container 420.

Embodiments of this disclosure can include monitoring and self-adapting. In one embodiment, the compare utility monitors the busy rates, and adjusts the threads for each type by the following rules:

1. Calculate average busy rate for each type of threads and determine if a thread is busy or not. In one embodiment, it has a threshold. If the busy rate is higher than the threshold, the utility assumes this thread is busy.

2. If tPartitioner is busy and tCombiner is not busy and QueueTask depth is not high, tPartitioner is the bottleneck. Reduce the number of tCombiner and create more producer tPartitioner, if possible.

3. If tCombiner is busy & tPartitioner is not busy & QueueTask depth is high, tCombiner is the bottleneck. Reduce the number of tPartitioner and create more tCombiner, if possible 4. If diffReporter is busy & QueueDiff is high, diffReporter is the bottleneck. Reduce the number of tCombiner threads and create more diffReporter, if possible.

The TDIFLIST table contains parameters of the compare of each pair of tables.

| TDIFLIST Table | |
|---|---|
| Column name | Description |
| COMPARE_ORDER | Data type: INTEGER; Nullable: N |
| | The sequence ID of the compare. |
| SOURCE_SCHEMA | Data type: VARCHAR(128); |
| | Nullable: NO |
| | The schema name of the source table |
| SOURCE_TABLE | Data type: VARCHAR(128); |
| | Nullable: NO |
| | The table name of the source table |
| TARGET_SCHEMA | Data type: VARCHAR(128); |
| | Nullable: NO |
| | The schema name of the target table |
| TARGET_TABLE | Data type: VARCHAR(128); |
| | Nullable: NO |
| | The table name of the target table |
| SOURCE_COLUMNS | Data type: VARCHAR(10239); |
| | Nullable: YES; DEFAULT: NULL |
| | The column lists of the source table. |
| | (optional) |

-continued

| TDIFLIST Table | |
|---|---|
| Column name | Description |
| SOURCE_KEY_COLUMNS | Data type: VARCHAR (2047); Nullable: YES; DEFAULT: NULL The key columns of the source table. (optional) |
| SOURCE_CHUNK_BY | Data type: VARCHAR(2047); Nullable: YES; DEFAULT: NULL The chunk-by columns of the source table. (optional) |
| COMPARE_MODE | Data type: CHAR(5); Nullable: NO; DEFAULT: 'FULL' Full/stats. (optional) |
| SOURCE_STATS_COLUMNS | Data type: VARCHAR(2047); Nullable: YES; DEFAULT: NULL The stats columns of the source table. (optional) |
| NUMBLOCKS | Data type: INTEGER; Nullable: NO; DEFAULT: 0 0/1. (optional) |
| MAXDIFF | Data type: INTEGER; Nullable: YES; DEFAULT: NULL The maximum number of differences (optional). Minimum and default value is 1. Maximum value is lower than the command-line MAXDIFF. |
| USE_SP | Data type: CHAR(1); Nullable: YES; DEFAULT: 'Y' Y/N (HIDDEN) |
| CHUNK_SIZE_IN_BYTES | Data type: INTEGER; Nullable: YES; DEFAULT: NULL (HIDDEN) |
| SAMPLE_PER_CHUNK | Data type: INTEGER; Nullable: YES; DEFAULT: NULL (HIDDEN) |
| CHUNK_RANGES | Data type: VARCHAR(511); Nullable: YES; DEFAULT: NULL A range of chunks to compare. (HIDDEN) |
| COMPARE_STATE | Data type: CHAR(1); Nullable: NO The compare state of this table pair. It can be R (Ready), C (Comparing) and F (Finished) |

In this disclosure, a system and method and computer program product are provided that enable lightweight table comparisons with high accuracy (high confidence). The features of the disclosed lightweight table comparison address this problem from the following aspects: 1) based on the statistical results; 2) on a sample basis; and 3) based on Materialized Query Tables (MQTs), which are tables whose definition is based on the query results.

In this disclosure, a system and method and computer program product are provided for data deduplication, emphasizing reference table synchronization to aid deduplication. Data is stored in shared storage, with deduplicated data and reference tables shared among clients. Clients locally run deduplication algorithms before transmitting data to shared storage, deciding whether to send the entire segment or just a reference if already present. Updates to the main reference table occur when new segments are analyzed. Clients may receive subsets of the reference table based on factors like data utilization, mitigating bandwidth and synchronization challenges.

The system comprises a deduplication system, an interface, and a processor. The deduplication system stores a duplicate copy of data from a data storage system by preserving a set of segments capable of reconstructing the stored data. The interface receives a command to revert the data in the storage system to a previous state stored in the deduplication system. The processor is configured to identify a subset of the stored data that has been altered between the current data state and the snapshot time state in the deduplication system using two sets of fingerprints associated with the data.

Turning now to FIG. 5, a flowchart depicts an adaptive method 500 to intelligently compare database in resumable batch mode. Block 510 includes loading, by a number of processor units, a plurality of LocalQueueTabPairs into a TablePair Info of a TablePair Container. Block 520 includes allocating, by the number of processor units, a plurality of available threads among a tPartitioner, a plurality of tCombiners of a Combiner Pool, and a diffReporter using an ArrayList of a threadManager of the TablePair Container. Block 530 includes delegating, by the number of processor units, a plurality of Queue Tasks from the TablePair Info among the plurality of tCombiners of the Combiner Pool using the tPartitioner and the TablePair Container. Block 540 includes identifying, by the number of processor units, differences from the plurality of Queue Tasks using the plurality of tCombiners of the Combiner Pool. Block 550 includes responsive to the differences, reporting, by the number of processor units, the differences to a Table Pair Result Map of the TablePair container using the diffReporter and the TablePair Container. Block 560 includes reallocating, by the number of processor units, the plurality of available threads among at least one of the tPartitioner, the plurality of tCombiners, and the diffReporter using the ArrayList of the threadManager of the TablePair Container.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

An advantage of embodiments of the present disclosure that has value within the technological arts is that multi-layer modules execute multiple threads simultaneously, improving the efficiency of the comparison process. Another advantage of embodiments of the present disclosure that has value within the technological arts is chunks can make sure the comparison is resumable. It's very time-consuming if there are some problems like network latency. Another advantage of embodiments of the present disclosure that has value within the technological arts is intelligently adjusting parameters and threads based on real-time bottleneck identification to ensure optimal performance.

A practical application of embodiments of the present disclosure that has value within the technological arts is a method and system for comparing table data. Another practical application of embodiments of the present disclosure that has value within the technological arts is synchronized data deduplication. Another practical application of embodiments of the present disclosure that has value within the technological arts is synchronization of storage using comparisons of fingerprints of blocks. Another practical application of embodiments of the present disclosure that has value within the technological arts is controlling the swapping and/or replacement of servers. The swapping and/or replacement of servers can be a hot-swapping or a cold-swapping. There are virtually innumerable uses for embodiments of the present disclosure, all of which need not be detailed here.

Figure 6:
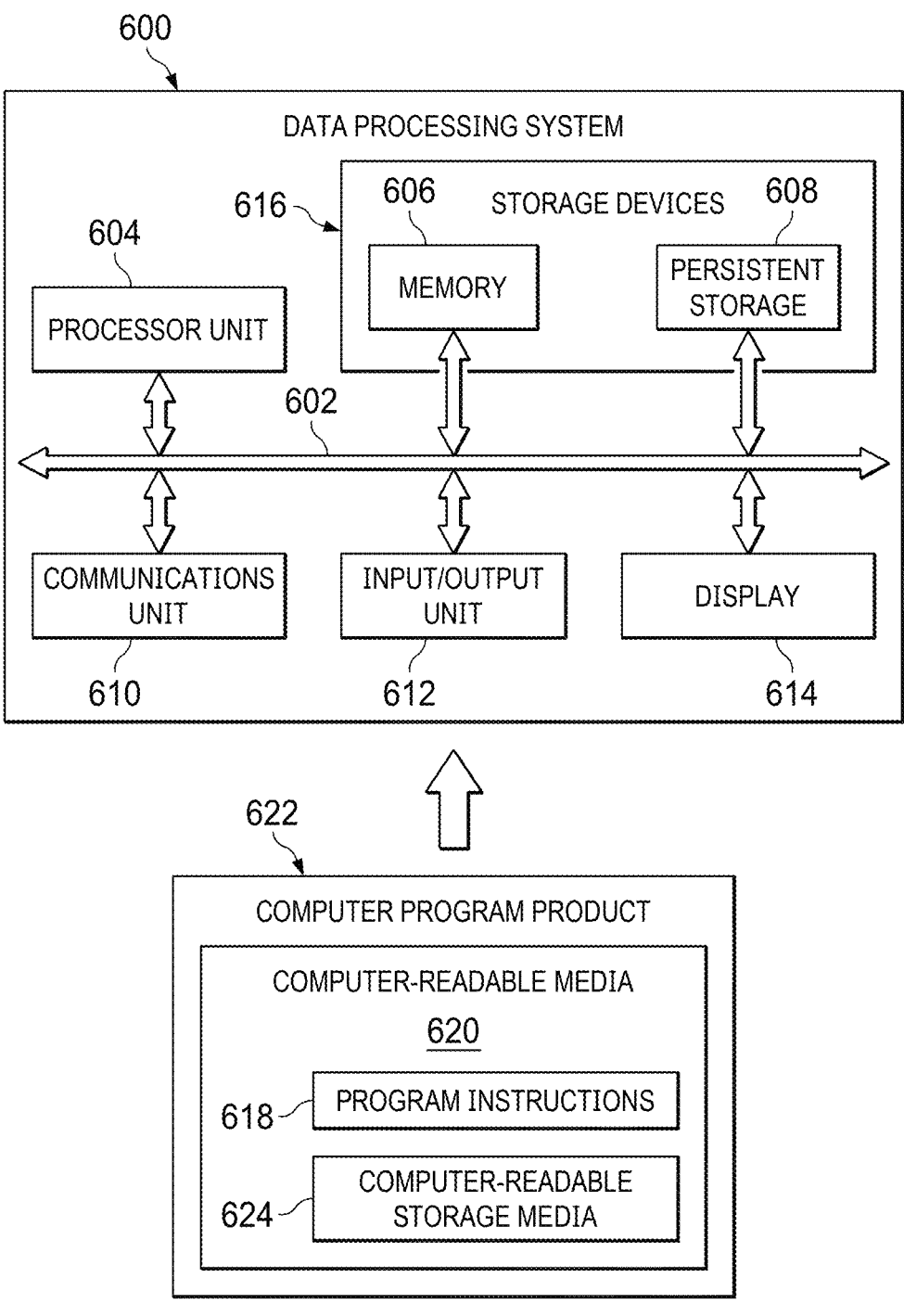
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement computers and computing devices in computing environment 100 in FIG. 1. Data processing system 600 can also be used to implement computer system 200 in FIG. 2. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 604 can be implemented using one or more heterogeneous processor systems in which a main processor is present with secondary processors on a single chip. As another illustrative example, processor unit 604 can be a symmetric multi-processor system containing multiple processors of the same type on a single chip.

Memory 606 and persistent storage 608 are examples of storage devices 616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 616 may also be referred to as computer readable storage devices in these illustrative examples. Memory 606, in these examples, can be, for example, a random-access memory or any other suitable volatile or non-volatile storage device. Persistent storage 608 may take various forms, depending on the particular implementation.

For example, persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program instructions, computer usable program instructions, or computer readable program instructions that can be read and executed by a processor in processor unit 604. The program instructions in the different embodiments can be embodied on different physical or computer readable storage media, such as memory 606 or persistent storage 608.

Program instructions 618 are located in a functional form on computer-readable media 620 that is selectively removable and can be loaded onto or transferred to data processing system 600 for execution by processor unit 604. Program instructions 618 and computer-readable media 620 form computer program product 622 in these illustrative examples. In the illustrative example, computer-readable media 620 is computer-readable storage media 624.

Computer-readable storage media 624 is a physical or tangible storage device used to store program instructions 618 rather than a medium that propagates or transmits program instructions 618. Computer-readable storage media 624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 618 can be transferred to data processing system 600 using a computer readable signal media. The computer readable signal media are signals and can be, for example, a propagated data signal containing program instructions 618. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 620 can be singular or plural. For example, program instructions 618 can be located in computer-readable media 620 in the form of a single storage device or system. In another example, program instructions 618 can be located in computer-readable media 620 that is distributed in multiple data processing systems. In other words, some instructions in program instructions 618 can be located in one data processing system while other instructions in program instructions 618 can be located in one data processing system. For example, a portion of program instructions 618 can be located in computer-readable media 620 in a server computer while another portion of program instructions 618 can be located in computer-readable media 620 located in a set of client computers.

The different components illustrated for data processing system 600 are not meant to provide architectural limitations to the manner in which different embodiments can be implemented. In some illustrative examples, one or more of the components may be incorporated in or otherwise form a portion of, another component. For example, memory 606, or portions thereof, may be incorporated in processor unit 604 in some illustrative examples. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program instructions 618.

Thus, illustrative embodiments of the present disclosure provide a computer-implemented method, computer system, and computer program product for repositioning a sequestering device in a data center. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
loading, by a number of processor units, a plurality of LocalQueueTabPairs data structures into a TablePair Info data structure of a TablePair Container data structure;
allocating, by the number of processor units, a plurality of available threads among a tPartitioner thread, a plurality of tCombiners threads of a Combiner Pool, and a diffReporter using an ArrayList of a threadManager of the TablePair Container data structure;
delegating, by the number of processor units, a plurality of Queue Tasks from the TablePair Info data structure among the plurality of tCombiners threads of the Combiner Pool using the tPartitioner thread and the TablePair Container data structure;
identifying, by the number of processor units, differences from the plurality of Queue Tasks using the plurality of tCombiners threads of the Combiner Pool;
responsive to the differences, reporting, by the number of processor units, the differences to a Table Pair Result Map of the TablePair container data structure using the diffReporter and the TablePair Container data structure; and
reallocating, by the number of processor units, the plurality of available threads among at least one of the tPartitioner thread, the plurality of tCombiners threads, and the diffReporter using the ArrayList of the threadManager of the TablePair Container data structure.

2. The computer implemented method of claim 1, further comprising monitoring, using the number of processor units, a plurality of busy rates for at least two subsets of the plurality of available threads; and
responsive to the plurality of busy rates, at least one of equalizing and increasing the plurality of busy rates by further reallocating, by the number of processors, the plurality of available threads among at least one of the tPartitioner thread, the plurality of tCombiners threads, and the diffReporter using the ArrayList of the threadManager of the TablePair Container data structure.

3. The computer implemented method of claim 1, wherein reallocating comprises reallocating, by the number of processor units, the plurality of available threads within the plurality of tCombiners threads using the ArrayList of the threadManager of the TablePair Container data structure.

4. The computer implemented method of claim 3, further comprising monitoring, using the number of processor units, a plurality of busy rates for at least two subsets of the plurality of available threads; and
responsive to the plurality of busy rates, at least one of equalizing and increasing the plurality of busy rates by further reallocating, by the number of processors, the plurality of available threads within the plurality of tCombiners threads using the ArrayList of the threadManager of the TablePair Container data structure.

5. The computer implemented method of claim 1, wherein reallocating comprises reallocating, by the number of processor units, the plurality of available threads between at least two of the tPartitioner thread, the plurality of tCombiners threads, and the diffReporter using the ArrayList of the threadManager of the TablePair Container data structure.

6. The computer implemented method of claim 5, further comprising monitoring, using the number of processor units, a plurality of busy rates for at least two subsets of the plurality of available threads; and
responsive to the plurality of busy rates, at least one of equalizing and increasing the plurality of busy rates by further reallocating, by the number of processors, the plurality of available threads between at least two of the tPartitioner thread, the plurality of tCombiners threads, and the diffReporter using the ArrayList of the threadManager of the TablePair Container data structure.

7. The computer implemented method of claim 1, further comprising pausing and resuming while in a batch mode the step of identifying, by the number of processor units, differences from the plurality of Queue Tasks using the plurality of tCombiners threads of the Combiner Pool.

8. The computer implemented method of claim 1, further comprising rechecking the differences, by the number of processor units, using a DiffRecheck.

9. A computer system comprising:
a processor set;
a set of one or more computer readable storage media;
program instructions, collectively stored in the set of one or more storage media, for causing the processor set to perform the following computer operations:
load, by a number of processor units, a plurality of LocalQueueTabPairs data structures into a TablePair Info data structure of a TablePair Container data structure;
allocate, by the number of processor units, a plurality of available threads among a tPartitioner thread, a plurality of tCombiners threads of a Combiner Pool, and a diffReporter using an ArrayList of a threadManager of the TablePair Container data structure;
delegate, by the number of processor units, a plurality of Queue Tasks from the TablePair Info data structure among the plurality of tCombiners threads of the Combiner Pool using the tPartitioner thread and the TablePair Container data structure;
identify, by the number of processor units, differences from the plurality of Queue Tasks using the plurality of tCombiners threads of the Combiner Pool;

responsive to the differences, report, by the number of
processor units, the differences to a Table Pair Result
Map of the TablePair container data structure using the
diffReporter and the TablePair Container data structure;
and reallocate, by the number of processor units, the plurality
of available threads among at least one of the tParti-
tioner thread, the plurality of tCombiners threads, and
the diffReporter using the ArrayList of the threadMan-
ager of the TablePair Container data structure.

10. The computer system of claim 9, wherein the program
instructions cause the processor set to perform the following
computer operations:

monitor, using the number of processor units, a plurality
of busy rates for at least two subsets of the plurality of
available threads; and responsive to the plurality of busy rates, at least one of
equalize and increase the plurality of busy rates by
further reallocate by the number of processors, the
plurality of available threads among at least one of the
tPartitioner thread, the plurality of tCombiners threads,
and the diffReporter using the ArrayList of the thread-
Manager of the TablePair Container data structure.

11. The computer system of claim 9, wherein reallocating
comprises reallocating, by the number of processor units, the
plurality of available threads within the plurality of tCom-
biners threads using the ArrayList of the threadManager of
the TablePair Container data structure.

12. The computer system of claim 11, wherein the pro-
gram instructions cause the processor set to perform the
following computer operations:

monitoring, using the number of processor units, a plu-
rality of busy rates for at least two subsets of the
plurality of available threads; and responsive to the plurality of busy rates, at least one of
equalizing and increasing the plurality of busy rates by
further reallocating, by the number of processors, the
plurality of available threads within the plurality of
tCombiners threads using the ArrayList of the thread-
Manager of the TablePair Container data structure.

13. The computer system of claim 9, wherein reallocating
comprises reallocating, by the number of processor units, the
plurality of available threads between at least two of the
tPartitioner thread, the plurality of tCombiners threads, and
the diffReporter using the ArrayList of the threadManager of
the TablePair Container data structure.

14. The computer system of claim 13, wherein the pro-
gram instructions cause the processor set to perform the
following computer operations:

monitoring, using the number of processor units, a plu-
rality of busy rates for at least two subsets of the
plurality of available threads; and responsive to the plurality of busy rates, at least one of
equalizing and increasing the plurality of busy rates by
further reallocating, by the number of processors, the
plurality of available threads between at least two of the
tPartitioner thread, the plurality of tCombiners threads,
and the diffReporter using the ArrayList of the thread-
Manager of the TablePair Container data structure.

15. The computer system of claim 9, wherein the program
instructions cause the processor set to perform the following
computer operations:

pausing and resuming while in a batch mode the step of
identifying, by the number of processor units, differ-
ences from the plurality of Queue Tasks using the
plurality of tCombiners threads of the Combiner Pool.

16. The computer system of claim 9, wherein the program
instructions cause the processor set to perform the following
computer operations:

rechecking the differences, by the number of processor
units, using a DiffRecheck.

17. A computer program product comprising:

a set of one or more computer-readable storage media;
and program instructions, collectively stored in the set of one
or more storage media, for causing a processor set to
perform the following computer operations:

loading, by a number of processor units, a plurality of
LocalQueueTabPairs data structures into a TablePair
Info data structure of a TablePair Container data struc-
ture;

allocating, by the number of processor units, a plurality of
available threads among a tPartitioner thread, a plural-
ity of tCombiners threads of a Combiner Pool, and a
diffReporter using an ArrayList of a threadManager of
the TablePair Container data structure;

delegating, by the number of processor units, a plurality
of Queue Tasks from the TablePair Info data structure
among the plurality of tCombiners threads of the Com-
biner Pool using the tPartitioner thread and the Table-
Pair Container data structure;

identifying, by the number of processor units, differences
from the plurality of Queue Tasks using the plurality of
tCombiners threads of the Combiner Pool;

responsive to the differences, reporting, by the number of
processor units, the differences to a Table Pair Result
Map of the TablePair container data structure using the
diffReporter and the TablePair Container data structure;
and reallocating, by the number of processor units, the plu-
rality of available threads among at least one of the
tPartitioner thread, the plurality of tCombiners threads,
and the diffReporter using the ArrayList of the thread-
Manager of the TablePair Container data structure.

18. The computer program product of claim 17, wherein
the program instructions cause the processor set to perform
the following computer operations:

monitoring, using the number of processor units, a plu-
rality of busy rates for at least two subsets of the
plurality of available threads; and responsive to the plurality of busy rates, at least one of
equalizing and increasing the plurality of busy rates by
further reallocating, by the number of processors, the
plurality of available threads among at least one of the
tPartitioner thread, the plurality of tCombiners threads,
and the diffReporter using the ArrayList of the thread-
Manager of the TablePair Container data structure.

19. The computer program product of claim 17, wherein
reallocating comprises reallocating, by the number of pro-
cessor units, the plurality of available threads within the
plurality of tCombiners threads using the ArrayList of the
threadManager of the TablePair Container data structure.

20. The computer program product of claim 19, wherein
the program instructions cause the processor set to perform
the following computer operations:

monitoring, using the number of processor units, a plu-
rality of busy rates for at least two subsets of the
plurality of available threads; and responsive to the plurality of busy rates, at least one of
equalizing and increasing the plurality of busy rates by
further reallocating, by the number of processors, the
plurality of available threads within the plurality of tCombiners threads using the ArrayList of the thread-Manager of the TablePair Container data structure.

* * * * *